United States Patent [19]
Allen et al.

[11] Patent Number: 5,849,172
[45] Date of Patent: Dec. 15, 1998

[54] COPPER SOLVENT EXTRACTION AND ELECTROWINNING PROCESS

[75] Inventors: Glenn C. Allen, Apache Junction; Neil J. Nebeker, Kearny; George R. Burns, Gilbert, all of Ariz.

[73] Assignee: ASARCO Incorporated, New York, N.Y.

[21] Appl. No.: 882,185

[22] Filed: Jun. 25, 1997

[51] Int. Cl.⁶ .................................. C25C 1/12; C22B 1/00
[52] U.S. Cl. .................... 205/581; 205/583; 205/584; 205/586; 75/746
[58] Field of Search .................................. 205/580, 581, 205/583, 584, 586; 75/746

[56] References Cited

U.S. PATENT DOCUMENTS

| | | | |
|---|---|---|---|
| 3,703,451 | 11/1972 | Healy et al. | 204/106 |
| 3,880,650 | 4/1975 | Pemsler | 75/72 |
| 3,989,607 | 11/1976 | Bush et al. | 204/108 |
| 4,120,769 | 10/1978 | Prestridge | 204/186 |
| 4,269,676 | 5/1981 | Libus et al. | 204/107 |
| 4,272,492 | 6/1981 | Jensen | 423/24 |
| 4,309,404 | 1/1982 | Richards et al. | 205/581 |
| 4,364,824 | 12/1982 | Snow | 209/167 |
| 4,372,843 | 2/1983 | Lawver et al. | 209/12 |
| 4,454,017 | 6/1984 | Swanson | 208/11 R |
| 4,810,365 | 3/1989 | Dohler et al. | 208/262.1 |
| 4,874,534 | 10/1989 | Sorensen et al. | 210/803 |
| 4,881,473 | 11/1989 | Skinner | 110/244 |
| 4,941,966 | 7/1990 | Merz et al. | 208/112 |
| 5,064,523 | 11/1991 | Kretschmar et al. | 208/112 |
| 5,112,479 | 5/1992 | Srimongkolkul | 210/149 |
| 5,123,956 | 6/1992 | Fernandez et al. | 75/423 |
| 5,162,107 | 11/1992 | Hirsch et al. | 423/623 |
| 5,176,802 | 1/1993 | Duyvesteyn et al. | 204/106 |
| 5,199,997 | 4/1993 | Stowe | 134/25.1 |
| 5,223,024 | 6/1993 | Jones | 75/743 |
| 5,316,567 | 5/1994 | Jones | 75/743 |
| 5,366,599 | 11/1994 | Majima et al. | 204/106 |
| 5,388,708 | 2/1995 | Bouchillon et al. | 209/728 |
| 5,431,788 | 7/1995 | Jones | 204/104 |
| 5,527,382 | 6/1996 | Alvarez et al. | 75/712 |

*Primary Examiner*—Kathryn L Gorgos
*Assistant Examiner*—Edna Wong
*Attorney, Agent, or Firm*—DeLio & Peterson, LLC; John J. Tomaszewski; Kenneth A. Koch

[57] ABSTRACT

An improved method and apparatus is provided for the production of copper using a solvent extraction electrowinning process. Process streams formed during the process containing entrained liquids are fed to a cyclone to remove either organic extractant or water (aqueous solutions) from the stream. A raffinate stream fed to a cyclone removes entrained organic phase which organic phase may be recycled to the process. The separated raffinate stream would then typically be recycled to the copper ore leach step to form a pregnant leach solution without the loss of organic solvent and/or the environmental concerns associated with entrained solvent. In a preferred new process, mixers, preferably inline, are used in conjunction with cyclones to provide a solvent extraction electrowinning process which is continuous and efficient and the use of conventional mixers, and particularly settlers, are eliminated.

27 Claims, 4 Drawing Sheets

– 5,849,172 –

COPPER SOLVENT EXTRACTION AND ELECTROWINNING PROCESS

BACKGROUND OF THE INVENTION

1. Field of the Invention

The present invention relates to the production of copper by solvent extraction of copper containing solutions and the electrowinning of a rich copper electrolyte obtained by stripping copper from the copper containing solvent and, in particular, to methods and apparatus for improving existing copper production processes by removing entrained solvent and water from process streams and to a new copper solvent extraction and electrowinning process.

2. Description of Related Art

The recovery of copper from ore may be divided into two basic classes termed pyrometallurgy and hydrometallurgy. In pyrometallurgy processes, ores which are typically sulfur containing ores, are concentrated and the concentrate smelted and refined using furnaces to remove sulfur and other impurities. The copper is then cast into an anode and electrolytically processed in a copper refinery to produce a pure copper cathode product.

In the hydrometallurgical process for the production of copper, copper ore, typically a copper oxide ore or other copper source, is formed into a particulate mass such as a heap and a leach solution trickled over the heap so that the leach solution flows through the heap dissolving copper in the ore and forming a copper containing solution. The leachant is typically a weak solution of sulfuric acid and is usually obtained as a recycle stream from a downstream process step such as a raffinate stream from the organic copper extraction step. The copper-rich weakly acidic aqueous solution is typically referred to as a pregnant leach solution and is mixed with an organic solvent in a mixer. The solvent is substantially immiscible in the aqueous solution and extracts copper from the pregnant leach solution to form what is commonly termed a loaded organic stream. The pregnant leach solution and organic extractant are typically mixed together in a large agitated tank and then transferred to a settler where the organic phase and aqueous phases are allowed to separate to form an upper copper loaded organic phase and a lower copper depleted acidic aqueous raffinate phase.

The lower aqueous raffinate phase is removed from the settler and is typically recycled and used as a leachant to leach copper from the ore in the heap. The loaded organic phase is transferred to a second mixer and mixed with lean electrolyte which is obtained from the downstream electrowinning cell. The mixture is transferred to a second settler and the organic and aqueous phases allowed to separate. The lean electrolyte which is typically a highly acidic sulfuric acid stream extracts the copper from the loaded organic phase and forms a rich copper electrolyte aqueous phase. The rich copper electrolyte phase is fed to an electrowinning cell to form the copper product. Depleted electrolyte from the electrowinning cell termed lean electrolyte is recycled and is the stream mixed with the loaded organic in the mixer and settler to extract the copper from the loaded organic phase. In the mixer/settler operations the loaded organic phase which is now depleted of the extracted copper is typically termed the stripped organic phase and this phase is typically recycled to the first mixer to contact and extract copper from new pregnant leach solution.

As can be seen from FIG. 4 which shows a typical prior art copper solvent extraction-electrowinning process, there are a number of process streams which are either recycled or used in subsequent steps of the process. Because of the nature of the mixer and settler operations and the physical and chemical characteristics of the process streams, these process streams typically contain entrained liquids which are detrimental to the subsequent step or recycle step or which may be lost in the process causing a significant replacement cost and/or environmental problem. For example, raffinate stream 13 is recycled and used to leach copper ore and entrained organic solvent will be lost in the leaching operation adding a make-up expense to the process economics and also presenting environmental and other process problems. Similarly, entrained water in the loaded organic phase 17 decreases the efficiency of stripping copper from the loaded organic phase in the stripping step of the process and adds to the load on the mixer and stripper.

In U.S. Pat. No. 4,874,534 an improved method of separating organic solvents from aqueous process streams is disclosed in connection with a copper solvent extraction/electrowinning process. Aqueous solutions such as a raffinate process stream having droplets of an organic solvent entrained therein are fed into the upper part of a vertically extending vessel having air bubbles rising therein from an air inlet near the bottom of the vessel. The entrained organic solvent in the raffinate is collected and removed from the top of the vessel and recycled in the process.

U.S. Pat. Nos. 4,269,676, 4,272,492 and 5,176,802 show typical solvent extraction processes for recovering copper from copper sulfide ores, waste products from the pyrometallurgical processing of copper ores and copper containing acidic chloride solutions.

The above patents are hereby incorporated by reference.

Bearing in mind the problems and deficiencies of the prior art, it is therefore an object of the present invention to provide an improved method for the hydrometallurgical production of copper by a solvent extraction electrowinning process.

It is an additional object of the present invention to provide a new hydrometallurgical process for the production of copper using a solvent extraction electrowinning process.

It is a further object of the present invention to provide an apparatus for an improved process for the hydrometallurgical production of copper by a solvent extraction electrowinning process.

It is a still further object of the invention to provide an apparatus for a new hydrometallurgical process for the production of copper by a solvent extraction electrowinning process.

Still other objects and advantages of the invention will in part be obvious and will in part be apparent from the specification.

SUMMARY OF THE INVENTION

The above and other objects, which will be apparent to those skilled in the art, are achieved in the present invention which is directed in a first aspect to a method of removing entrained liquids from liquid process streams obtained in a copper solvent extraction electrowinning process wherein a copper containing pregnant leach solution is mixed with an immiscible organic extractant to extract the copper from the pregnant leach solution to form an aqueous raffinate process stream and a copper loaded organic process stream, and the loaded organic stream is mixed with an aqueous stream, preferably highly acidic, to extract copper from the loaded organic stream to produce a stripped organic extractant process stream and a copper rich aqueous electrolyte process stream which electrolyte stream is fed into an electrowinning cell and copper produced by electrowinning, the method comprising feeding one or more of the liquid process streams to one or more cyclones to remove entrained water or entrained organic extractant from the stream before the stream is used further in the process.

In an additional aspect of the invention, a method is provided for the recovery of copper from a copper containing source by a solvent extraction electrowinning process wherein a copper containing pregnant leach solution is extracted with an immiscible organic solvent to form a copper loaded organic stream, the loaded organic stream is stripped by an aqueous stream, preferably highly acidic, to form a copper rich electrolyte stream and the copper rich electrolyte stream is fed to an electrowinning cell to produce a copper product, the process comprising the steps of:

forming a copper containing pregnant leach solution preferably by exposing a copper containing source to a preferably relatively weak acid aqueous leachant solution;

mixing said pregnant leach solution with an organic solvent immiscible in water in a first mixer to extract copper from the solution by the organic solvent and forming a first mixture;

feeding the first mixture to a first cyclone to separate an overflow copper loaded organic stream and an underflow aqueous raffinate stream;

mixing the copper loaded organic stream with a preferably highly acidic aqueous solution in a second mixer and forming a second mixture;

feeding the second mixture to a second cyclone to separate a copper rich aqueous electrolyte underflow stream which is fed to an electrowinning cell for the recovery of a copper product and a copper stripped (barren) organic overflow stream; and electrowinning the rich copper electrolyte providing a copper (copper cathode) product.

In another aspect of the invention an apparatus is provided for the recovery of copper from a copper containing source by a solvent extraction electrowinning process comprising:

first mixing means to mix a copper containing solution and an immiscible organic extractant forming a first mixture;

first settling means to separate the first mixture into a first copper loaded organic phase and a first copper depleted aqueous phase;

first separation means to remove entrained water from the first loaded organic phase;

second separation means to remove entrained organic extractant from the first aqueous phase;

second mixing means to mix the first loaded organic phase and lean electrolyte from an electrowinning cell forming a second mixture;

second settling means to separate the second mixture into a copper stripped organic phase and a copper rich electrolyte phase;

third separation means to remove entrained organic extractant from the copper rich electrolyte stream;

an electrowinning cell to produce a copper (copper cathode) product from the copper rich electrolyte stream.

In a further aspect of the invention an apparatus is provided for the recovery of copper from a copper containing source by a solvent extraction electrowinning process comprising:

first mixing means to mix a copper containing aqueous solution and an immiscible organic extractant forming a first mixture; first separating means to separate the first mixture into an organic phase and an aqueous phase;

second mixing means to mix the organic phase and a copper lean electrolyte stream from a copper electrowinning cell forming a second mixture;

second separating means to separate the second mixture into a copper stripped organic phase and a copper rich aqueous electrolyte stream;

an electrowinning cell to provide a copper (copper cathode) product from the copper rich electrolyte stream.

In another aspect of the invention an apparatus is provided for the recovery of copper from a copper containing source by a solvent extraction electrowinning process comprising:

first mixing means to mix a copper containing aqueous solution and an immiscible organic extractant forming a first mixture;

first separating means to separate the first mixture into a first organic stream and a first aqueous stream;

second separating means to remove entrained water (aqueous solutions) from the first organic stream forming a second organic stream;

third separating means to separate entrained organic from the first aqueous stream forming a third organic stream and an underflow aqueous phase;

second mixing means to mix the second organic stream, third organic stream and lean electrolyte from a copper electrowinning cell forming a second mixture;

fourth separating means to separate the second mixture into a fourth organic stream and a fourth aqueous stream;

fifth separating means to separate the fourth organic stream into a stripped organic stream and a first copper rich electrolyte stream;

sixth separating means to separate entrained organic from the fourth aqueous phase forming a second copper rich electrolyte stream;

an electrowinning cell to provide a copper (copper cathode) product from the first copper rich electrolyte stream and second copper rich electrolyte stream.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
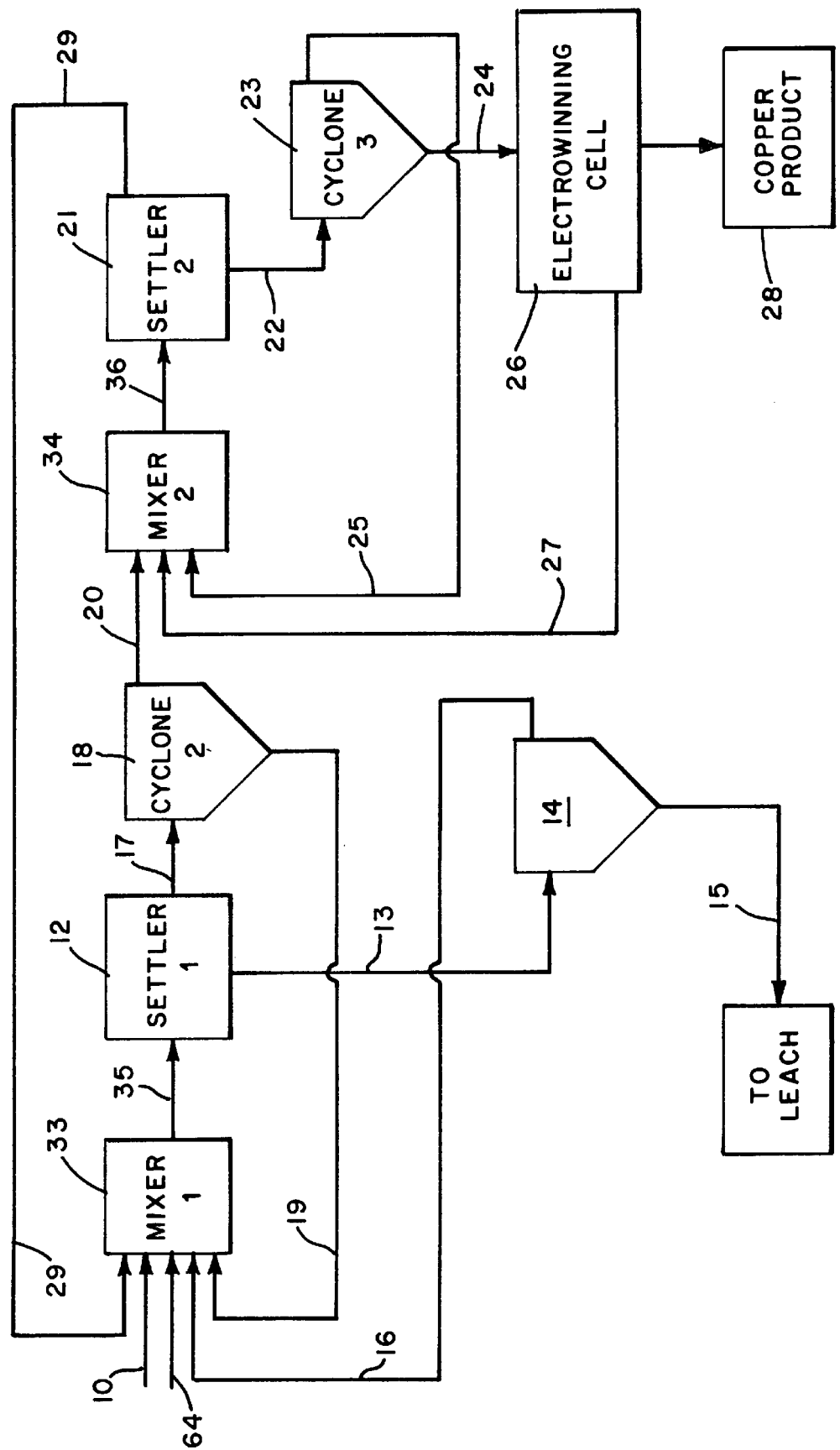
FIG. 1 is a flow diagram of an improved existing hydrometallurgical process for the production of copper.

In describing the preferred embodiment of the present invention, reference will be made herein to FIGS. 1–4 of the drawings. Features of the invention are not necessarily shown to scale in the drawings.

Figure 4:
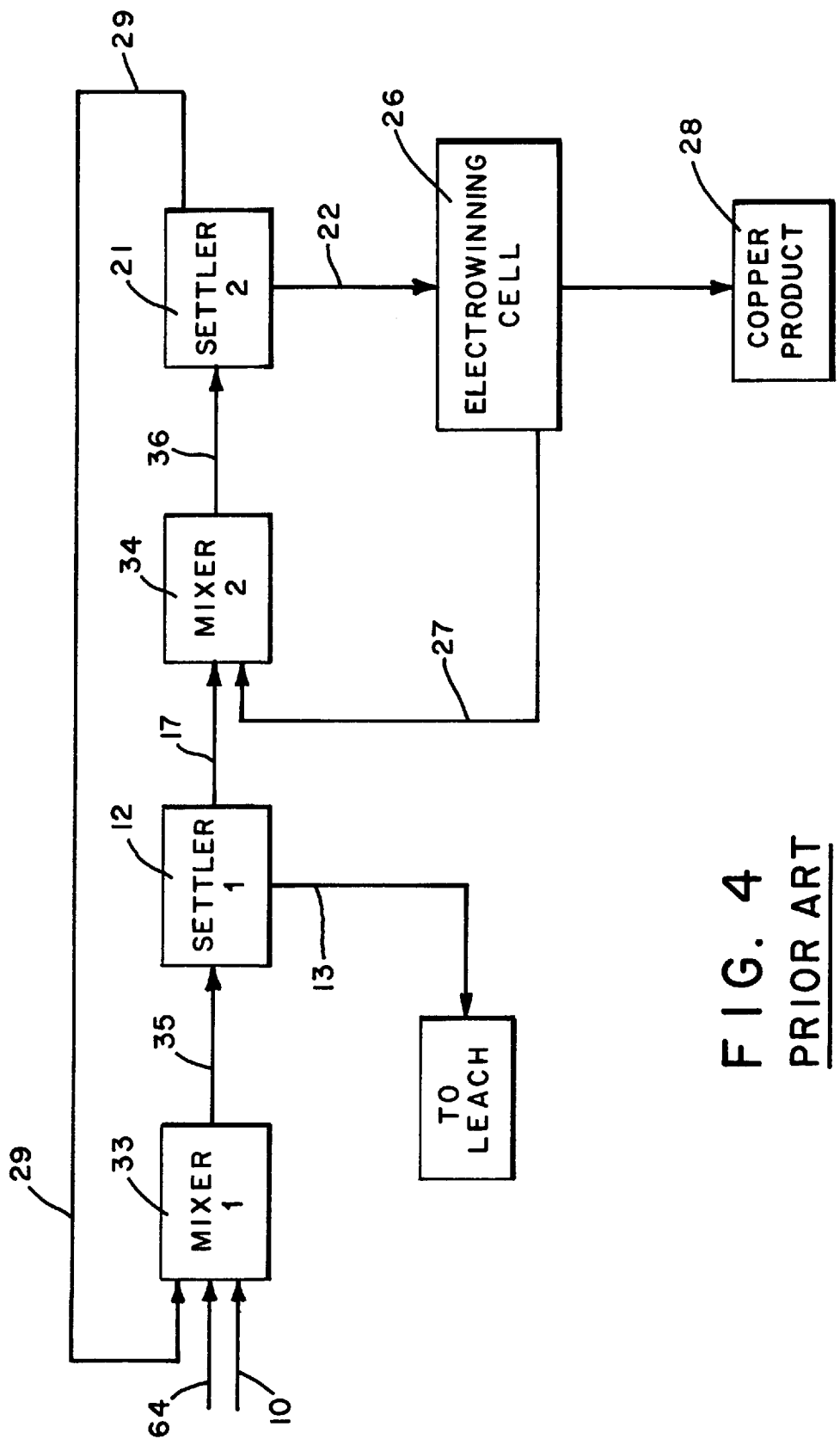
FIG. 4 is a flow diagram of a prior art hydrometallurgical copper process.

Referring to FIG. 4, a prior art process for the production of copper by a solvent extraction electrowinning process is shown. A copper containing pregnant leach solution 10 is fed into a first mixer 33 together with a recycled stripped organic extractant stream 29. Make up organic extractant 64 may also be added to the mixer to replenish lost and/or depleted organic extractant in the process. Mixing is typically performed by agitation with a stirrer for about 1 to 5 minutes and then the first mixture 35 is transferred to a first settler 12. The first settler 12 is typically a large tank in which the organic phase and aqueous phase are allowed to separate by standing. Separation usually takes less than about 30 minutes. After settling, a raffinate stream 13 is removed from first settler 12 and is typically recycled to leach copper ore to form new pregnant leach solution 10. The organic phase is removed from first settler 12 as stream 17 and is typically referred to as a copper loaded organic stream.

The copper loaded organic stream 17 is fed into second mixer 34 together with a lean electrolyte stream 27 obtained from electrowinning cell 26. The lean electrolyte stream 27 is low in copper concentration as a result of the electrowinning operation and is typically a highly acidic $H_2SO_4$ stream which is capable of extracting copper from the loaded organic stream phase 17. The second mixer 34 is typically an agitated vessel (stirrer) and the two streams are agitated and mixed for about 1 to 7 minutes. After mixing, the second mixed stream 36 is fed into second settler 21 and the phases are allowed to separate by standing. The upper stripped organic phase stream 29 which is now depleted in copper is typically recycled to first mixer 33 for extraction of copper from new pregnant leach solution 10. The lower aqueous phase is removed from second settler 21 as copper rich electrolyte stream 22 and fed into electrowinning cell 26.

The electrowinning process is well-known in the art and copper is plated typically onto copper starting sheets which serve as a cathode using an inert anode such as a calcium-tin-lead alloy. During the electrowinning operation, copper is depleted from the cell and it is the depleted copper stream removed from the cell which is termed lean electrolyte stream 27 and which is recycled to second mixer 34 for extraction of copper from loaded organic stream 17. The copper product 28 is a copper cathode product and is removed from electrowinning cell 26.

The organic extractant may be selected from a wide variety of solvents and is typically aldoxime in an admixture with a fatty alcohol and a hydrocarbon diluent. It is important that the organic solvent be essentially immiscible with the aqueous phases for copper separation and process efficiencies and economics. The pregnant leach solution 10 is typically a weak sulfuric acid copper containing solution comprising about 0.5 to 10 g/l copper and about 0.1 to 10 g/l sulfuric acid. The volume to volume ratio of the organic phase to the pregnant leach solution in the mixing and settling steps is about 1 to 1. The mixing operation and settling operation are both usually performed at ambient temperature although lower or higher temperatures may be used for certain purposes.

In the second mixer 34 and second settler 21 used for the loaded organic phase 17 and lean electrolyte phase 27, the volume to volume ratio of the organic phase to the aqueous phase is about 1 to 1. The temperature of the mixing operation and settling operation are typically at ambient temperatures although lower or higher temperatures may be used for certain purposes.

The prior art solvent extraction electrowinning process as shown in FIG. 4 is typically termed a batch operation wherein individual batches of solvent and solution are mixed for a certain period of time and then transferred to a settler and separated for a certain period of time. This type process will be contrasted with a continuous operation where the flow of organic extractant and aqueous solutions flow continuously in the process. This type continuous process will be exemplified in FIGS. 2 and 3 which shows a new continuous process for the solvent extraction electrowinning process for the production of copper. Regardless of the process, the electrowinning cell is operated continuously with copper product being constantly removed from the cell and replaced with new starting sheets for the plating of a copper product 28.

With regard to FIG. 1, a flow diagram of an improved hydrometallurgical solvent extraction electrowinning process for the recovery and production of copper is shown. A pregnant leach solution 10 is fed into first mixer 33 with a stripped organic extractant recycle stream 29 and a recycle second raffinate stream 19 from second cyclone 18. First organic overflow stream 16 from first cyclone 14 is also shown recycled to first mixer 33. Make-up organic solvent 64 may be added as needed. After mixing, the first mixture 35 is transferred to first settler 12. A settled first raffinate stream 13 is removed and fed into first cyclone 14. A third raffinate stream 15 is removed as underflow from first cyclone 14 and is preferably recycled to leach copper ore to produce new pregnant leach solution 10. The first organic overflow 16 from first cyclone 14 is shown being recycled to first mixer 33.

The loaded organic phase 17 from the first settler 12 is fed into second cyclone 18. The underflow 19 from second cyclone 18 is second raffinate stream 19 which is shown being recycled to first mixer 33. The second organic overflow stream 20 from second cyclone 18 is fed into second mixer 34. Also fed into second mixer 34 is lean electrolyte stream 27 from electrowinning cell 26 and third overflow stream 25 from third cyclone 23. After mixing, the second mixture 36 is transferred to second settler 21. After settling, the lower aqueous phase copper rich electrolyte stream 22 is fed into third cyclone 23. Underflow from third cyclone 23 is a copper rich electrolyte stream 24 which is fed to electrowinning cell 26. The third organic overflow 25 from third cyclone 23 is a stripped organic phase stream 25 which is shown being recycled to second mixer 34. The stripped organic phase stream 29 from second settler 21 is shown being recycled to first mixer 33.

As can be seen from the method of the invention of FIG. 1 as compared to the prior art method of FIG. 4, the first raffinate stream 13, loaded organic stream 17 and rich electrolyte stream 22 are fed into cyclones to remove entrained water (aqueous solutions) or organic from each of the streams. With regard to first raffinate stream 13, after removal of entrained organic as first organic overflow 16, the third raffinate stream 15 is recycled to leach new ore and provides a substantial savings in reducing the amount of organic extractant lost in the process as well as enhancing the leaching operations. Overflow copper containing extractant stream 16 is fed to first mixer 33 for extraction of copper from pregnant leach solution 10 instead of normally being recycled to the heap as entrained extractant. Removal of organic extractant from first raffinate stream 13 producing third raffinate stream 15 is also beneficial to the heap leaching operation where the organic extractant would be lost and/or create environmental problems. Similar savings and process benefits are obtained from the use of cyclones 18 and 23 which remove significant amounts of water (aqueous solutions) or organic extractant from the streams and enhance the process.

Figure 2:
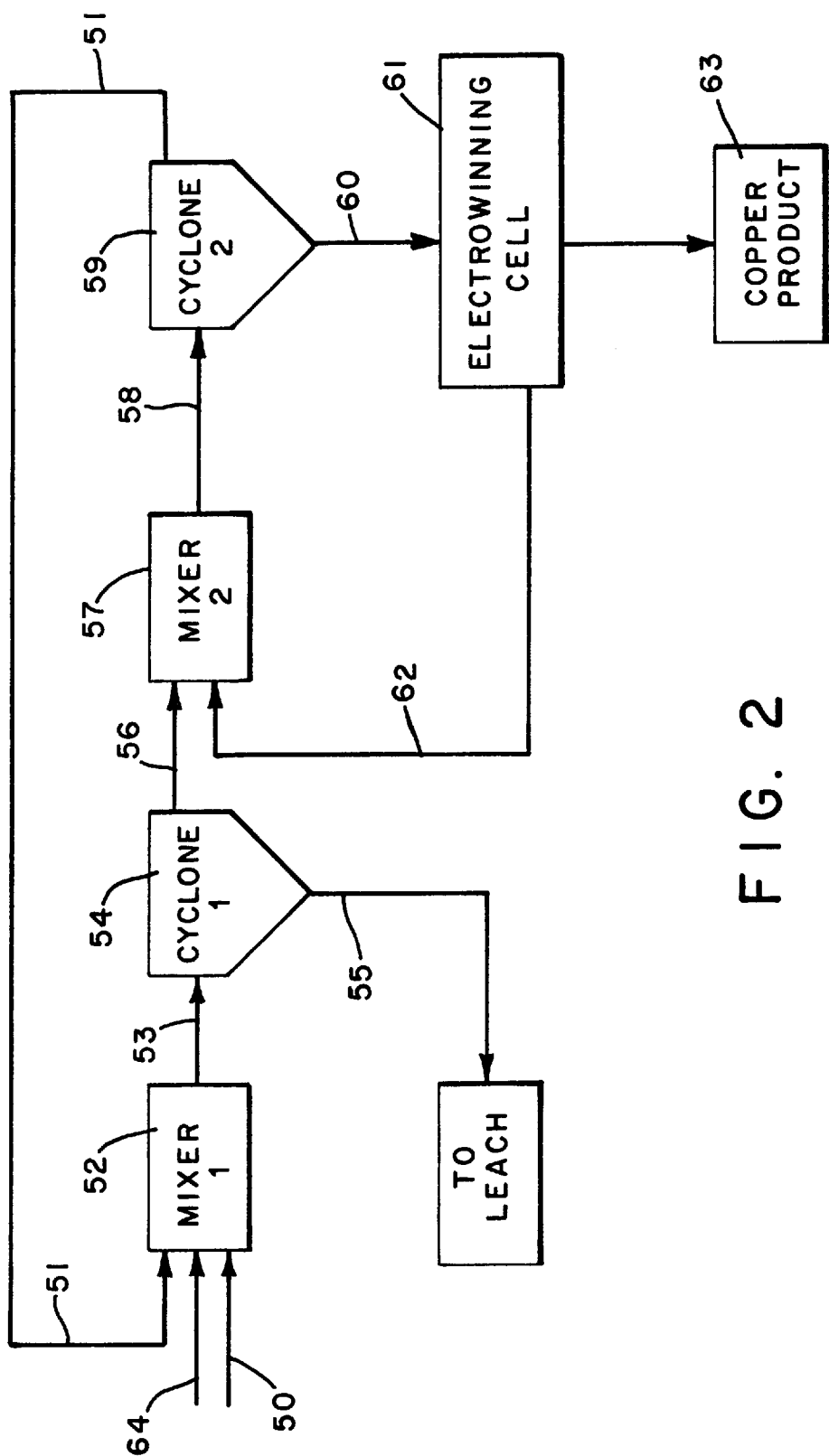
FIGS. 2 and 3 are flow diagrams of a new process for the hydrometallurgical production of copper.

FIG. 2 shows a new method for the production for copper by electrowinning using a solvent extraction process. A pregnant leach solution 50 which may be obtained from any source such as the heap leaching of copper ore is fed into first inline mixer 52 together with a stripped organic phase recycle stream 51. Make-up extractant 64 may be added as needed. During travel through the inline mixer 52, copper is extracted from the pregnant leach solution 50 into organic extractant 51 (and 64) and a mixed immiscible first mixture stream 53 is formed. The first mixture stream 53 is fed into first cyclone 54 to separate the aqueous and organic phases. The underflow from first cyclone 54 is raffinate stream 55 which would typically be recycled to the leaching operation to leach ore and to form pregnant leach solution 50. Overflow from first cyclone 54 is a copper loaded organic stream 56. The loaded organic stream 56 contains extracted copper and is mixed in second inline mixer 57 with lean electrolyte stream 62 obtained from electrowinning cell 61. During travel of the two streams through second inline mixer 57, the aqueous lean electrolyte stream 62 extracts copper from the copper loaded organic phase stream 56. A second mixture 58 of the two phases is obtained and fed into second cyclone 59. The underflow from second cyclone 59 is rich electrolyte stream 60 which is fed to electrowinning cell 61 for recovery of copper product 63. The overflow from second cyclone 59 is stripped organic stream 51 which is recycled to first mixer 52 for extraction of copper from new pregnant leach solution 50.

Figure 3:
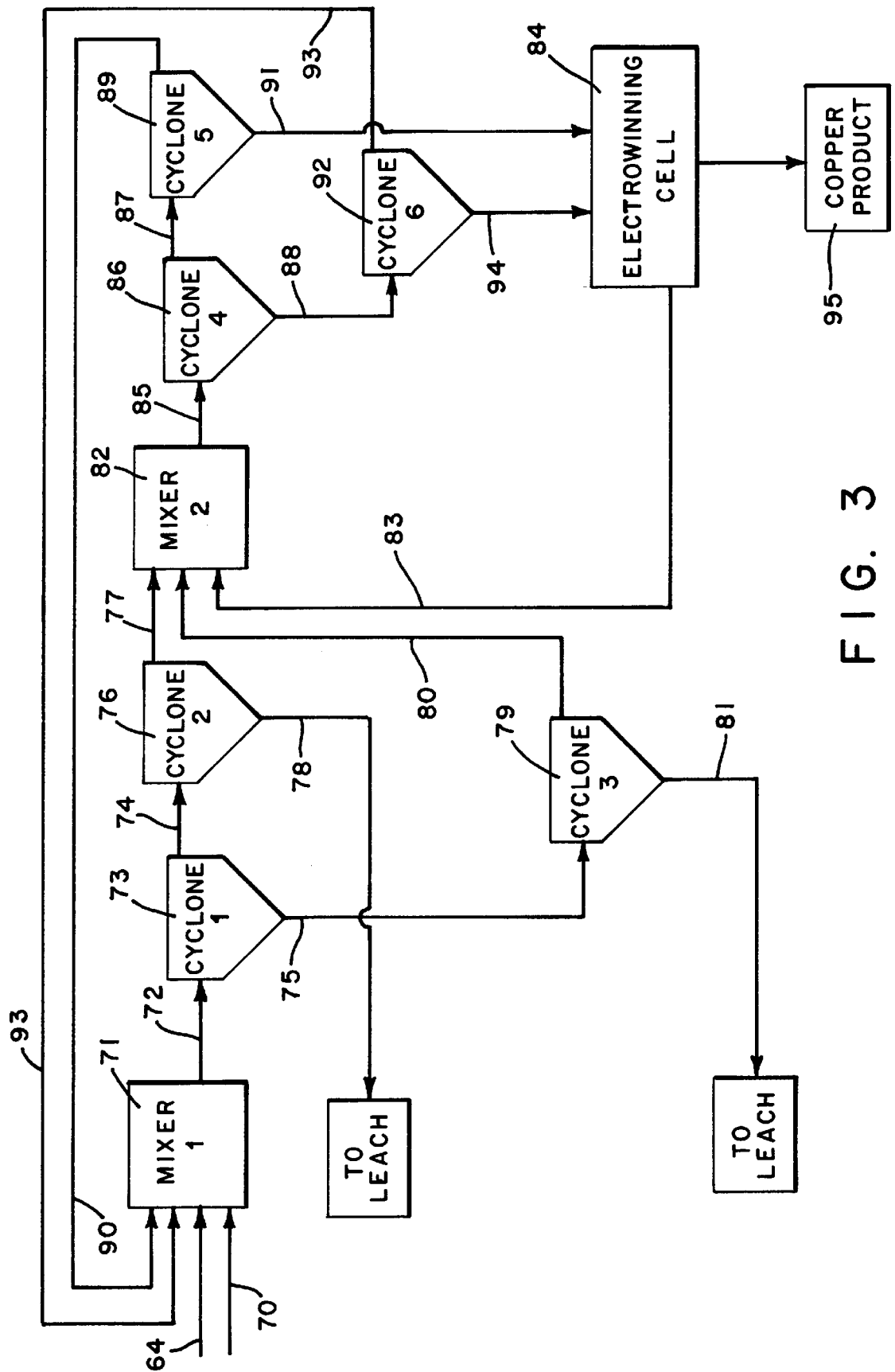

FIG. 3 shows a new process for the solvent extractant electrowinning process for the production of copper and is a preferred process from that shown in FIG. 2. A pregnant leach solution 70 is fed into first inline mixer 71 along with cyclone overflow recycle stripped organic streams 90 and 93. Makeup organic extractant 64 may also be added to first inline mixer 71. The resulting first mixture 72 is fed into first cyclone 73 to provide an overflow first loaded organic stream 74 and a first underflow raffinate stream 75. The first loaded organic stream 74 is fed into second cyclone 76 to produce a second overflow loaded organic stream 77 and a second underflow raffinate stream 78. The first raffinate stream 75 is fed into third cyclone 79 and provides a third overflow loaded organic stream 80 and a third raffinate stream 81. Raffinate streams 78 and 81 will typically be recycled to leach ore as shown in the figure. The loaded organic streams 77 and 80 are shown fed into second inline mixer 82 together with lean electrolyte stream 83 from electrowinning cell 84. The mixture 85 is fed into fourth cyclone 86 and produces an overflow stripped organic stream 87 and a rich electrolyte underflow stream 88. The stripped organic stream 87 is fed into fifth cyclone 89 and produces an overflow stripped organic stream 90 which is shown being recycled to first inline mixer 71. The underflow electrolyte stream 91 is shown being fed into electrowinning cell 84. Rich electrolyte stream 88 from fourth cyclone 86 is fed into sixth cyclone 92 and produces an overflow stripped organic stream 93 which is shown recycled to first mixer 71. The underflow is rich electrolyte stream 94 is shown being fed into electrowinning cell 84. Copper product 95 is shown being produced by electrowinning cell 84.

It will be appreciated by those skilled in the art that the many process streams shown in the above flow diagrams may be employed as recycle streams as shown therein but may also be used as other recycle streams. For example, in FIG. 1, raffinate stream 19 is shown being recycled to first mixer 33. Raffinate stream 19 may instead, for some purposes, be recycled to leach additional ore to produce pregnant leach solution 10. Further, in FIG. 1, stripped organic stream 25 from third cyclone 23 may be recycled to first mixer 33 instead of being recycled to second mixer 34 as shown in the figure.

With regard to the new plant flow sheet as shown in FIG. 2, raffinate stream 55, for example, may be recycled either partly or totally to first inline mixer 52 instead of being recycled to leach additional ore as shown in the figure. With regard to the preferred process shown in FIG. 3, raffinate streams 78 and 81 may be either together or separately be recycled to first inline mixer 71 instead of to leach additional ore as shown in the figure. Stripped organic stream 93 may be fed to second inline mixer 82 instead of recycled to first inline mixer 71 as shown in the figure. Other recycle flows may be employed as will be appreciated by those skilled in the art.

Inline mixers are preferred but it will be appreciated that conventional mixers or pumps may also be employed with the proviso that a mixed stream be fed to a cyclone for separation into an organic overflow stream and an aqueous underflow stream.

In another embodiment of the invention, the crud formed at the interface of the stripper unit (e.g., second settler 21 in FIG. 1), may be fed into a cyclone and the organic phases and aqueous phase separated. The overflow organic phase could be recycled to the first mixer 33 and the underflow aqueous phase containing most of the crud recycled to electrowinning cell 26 or third cyclone 23.

The inline mixers and cyclones employed in the above methods of the invention are properly sized and configured to provide the desired mixing and separation results as will be appreciated by those skilled in the art. Varying the design of the inline mixer and cyclones and the operating characteristics thereof will determine the efficiencies of the mixing and liquid/liquid separations obtained.

With regard to the cyclones used in the process, it has been found that excessive aeration of the cyclone feed may produce an emulsion which decreases cyclone separation efficiency. The use of a positive displacement or centrifugal pump will satisfactorily supply a mixed feed to the cyclone. It is preferred to use Krebs Reoiler liquid/liquid cyclones such as the 1" L1, 1½" L1.5, 2"L2 and 3" L3. In general, separation efficiency can be enhanced by controlling the orifice size of the cyclone as follows. The vortex finder or overflow reject orifice is sized smaller to recover entrained organic from aqueous. It is sized larger to reject entrained aqueous from organic. Manipulation of the underflow control valve will fine tune pressures, and, hence, separation efficiencies.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of removing entrained liquids from liquid process streams obtained in a copper solvent extraction electrowinning process consisting essentially of:

mixing a copper containing pregnant leach solution with an immiscible organic extractant to extract the copper from the pregnant leach solution to form an aqueous raffinate process stream and a copper loaded organic process stream;

mixing the loaded organic stream with an aqueous stream to extract copper from the loaded organic stream to produce a stripped organic extractant process stream and a copper rich aqueous electrolyte process stream;

feeding the electrolyte process stream into an electrowinning cell to produce copper by electrowinning; and feeding one or more of the above liquid process streams to one or more cyclones to remove entrained water or entrained organic extractant from the stream before the stream is used further in the method.

2. The method of claim 1 wherein the raffinate stream is fed to a cyclone to remove entrained organic extractant from the raffinate stream.

3. The method of claim 1 wherein the loaded organic stream is fed to a cyclone to remove entrained water from the loaded organic stream.

4. The method of claim 1 wherein the rich electrolyte stream is fed to a cyclone to remove entrained organic phase from the rich electrolyte stream.

5. The method of claim 1 wherein the stripped organic stream is fed to a cyclone to remove entrained rich electrolyte from the stream.

6. The method of claim 1 wherein the raffinate stream is fed to a cyclone, the loaded organic stream is fed to a cyclone and the rich electrolyte stream is fed to a cyclone to produce respective overflow and underflow recycle streams.

7. The method of claim 1 wherein the copper containing pregnant leach solution is obtained by leaching copper ore with a weakly acidic material.

8. The method of claim 1 wherein the cyclone is a liquid/liquid cyclone.

9. The method of claim 1 wherein a crud interface material obtained from a settler used to separate the stripped organic extractant from the copper rich electrolyte is fed to a cyclone to separate organic and aqueous phases.

10. A method for the recovery of copper from a copper containing source by a solvent extraction electrowinning process wherein a copper containing pregnant leach solution is extracted with an immiscible organic solvent to form a copper loaded organic stream, the loaded organic stream is stripped by an aqueous stream to form a copper rich electrolyte stream and the copper rich electrolyte stream is fed to an electrowinning cell to produce a copper product, the method consisting essentially of the steps of:

forming the copper containing pregnant leach solution by exposing a copper containing source to a relatively weak acid aqueous leachant solution;

mixing said pregnant leach solution with an organic solvent immiscible in water in a first mixer to extract copper from the solution by the organic solvent and forming a first mixture;

feeding the first mixture to a first cyclone to separate an overflow copper loaded organic stream and an underflow aqueous raffinate stream;

mixing the copper loaded organic stream with a highly acidic aqueous solution in a second mixer and forming a second mixture;

feeding the second mixture to a second cyclone to separate a copper rich aqueous electrolyte underflow stream which is fed to an electrowinning cell for the recovery of the copper product and a copper stripped organic overflow stream; and electrowinning the rich copper electrolyte providing the copper product.

11. The method of claim 10 wherein the highly acidic aqueous solution is a copper depleted electrolytic stream obtained from the electrowinning cell.

12. The method of claim 11 wherein the underflow aqueous raffinate stream is recycled as a leachant solution to form the copper containing pregnant leach solution.

13. The method of claim 10 wherein the overflow copper loaded organic solution is fed to a cyclone to separate entrained water.

14. The method of claim 13 wherein the underflow aqueous raffinate stream is fed to a cyclone to separate entrained organic extractant.

15. The method of claim 14 wherein the copper stripped organic overflow stream is fed to a cyclone to remove entrained water.

16. The method of claim 15 wherein the copper rich aqueous electrolyte underflow stream is fed to a cyclone to remove entrained organic extractant.

17. An apparatus for the recovery of copper from a copper containing source by a solvent extraction electrowinning process consisting essentially of:

first mixing means to mix a copper containing solution and an immiscible organic extractant forming a first mixture;

first settling means to separate the first mixture into a first copper loaded organic phase and a first copper depleted aqueous phase;

first cyclone separation means to remove entrained water from the first loaded organic phase;

second cyclone separation means to remove entrained organic extractant from the first aqueous phase;

second mixing means to mix the first loaded organic phase and lean electrolyte from an electrowinning cell forming a second mixture;

second settling means to separate the second mixture into a copper stripped organic phase and a copper rich electrolyte stream;

third cyclone separation means to remove entrained organic extractant from the copper rich electrolyte stream; and an electrowinning cell to produce a copper product from the copper rich electrolyte stream.

18. The apparatus of claim 17 wherein the copper containing aqueous solution is a pregnant leach solution obtained from leaching copper ore with a weakly acidic material.

19. An apparatus for the recovery of copper from a copper containing source by a solvent extraction electrowinning consisting essentially of:

first mixing means to mix a copper containing aqueous solution and an immiscible organic extractant forming a first mixture;

first cyclone separating means to separate the first mixture into an organic phase and an aqueous phase;

second mixing means to mix the organic phase and a copper lean electrolyte stream from a copper electrowinning cell forming a second mixture;

second cyclone separating means to separate the second mixture into a copper stripped organic phase and a copper rich aqueous electrolyte stream; and an electrowinning cell to provide a copper product from the copper rich electrolyte stream.

20. The apparatus of claim 19 wherein the copper containing aqueous solution is a pregnant leach solution obtained by leaching copper ore with a weakly acidic material.

21. An apparatus for the recovery of copper from a copper containing source by a solvent extractant electrowinning process consisting essentially of:

first mixing means to mix a copper containing aqueous solution and an immiscible organic extractant forming a first mixture;

first cyclone separating means to separate the first mixture into a first organic stream and a first aqueous stream;

second cyclone separating means to remove entrained water from the first organic stream forming a second organic stream;

third cyclone separating means to separate entrained organic from the first aqueous stream forming a third organic stream and an underflow aqueous phase;

second mixing means to mix the second organic stream, third organic stream and lean electrolyte from a copper electrowinning cell forming a second mixture;

fourth cyclone separating means to separate the second mixture into a fourth organic stream and a fourth aqueous stream;

fifth cyclone separating means to separate the fourth organic stream into a stripped organic stream and a first copper rich electrolyte stream;

sixth cyclone separating means to separate entrained organic from the fourth aqueous stream forming a second copper rich electrolyte stream; and an electrowinning cell to provide a copper product from the first copper rich electrolyte stream and second copper rich electrolyte stream.

22. The apparatus of claim 21 wherein the copper containing aqueous solution is a pregnant leach solution obtained from the leaching of copper ore by a weak acidic material.

23. A method for the recovery of copper from a copper containing source by a solvent extraction electrowinning process wherein a copper containing pregnant leach solution is extracted with an immiscible organic solvent to form a copper loaded organic stream, the loaded organic stream is stripped by an aqueous stream to form a copper rich electrolyte stream and the copper rich electrolyte stream is fed to an electrowinning cell to produce a copper product, the method consisting essentially of the steps of:

forming the copper containing pregnant leach solution by exposing a copper containing source to a relatively weak acid aqueous leachant solution;

mixing said pregnant leach solution with an organic solvent immiscible in water in a first mixer to extract copper from the solution by the organic solvent and forming a first mixture;

feeding the first mixture to a first cyclone to separate a first overflow copper loaded organic stream and a first underflow aqueous raffinate stream;

feeding the first overflow copper loaded organic stream to a second cyclone to produce a second overflow loaded organic stream and a second underflow raffinate stream;

feeding the first underflow aqueous raffinate stream to a third cyclone to separate a third overflow loaded organic stream and a third underflow aqueous raffinate stream;

feeding the second overflow loaded organic stream and third overflow organic stream to a second mixer with a highly acidic aqueous solution and forming a second mixture;

feeding the second mixture to a fourth cyclone to separate a first overflow stripped organic stream and a first rich electrolyte underflow stream;

feeding the first overflow stripped organic stream to a fifth cyclone to separate a second overflow stripped organic stream and a second rich electrolyte underflow stream;

feeding the first rich electrolyte underflow stream to a sixth cyclone to separate a third overflow stripped organic stream and a third rich electrolyte underflow stream; and electrowinning the second rich electrolyte underflow stream providing the copper product.

24. The method of claim 23 wherein the highly acidic aqueous solution is a copper depleted electrolyte stream obtained from the electrowinning cell.

25. The method of claim 24 wherein the second and third underflow aqueous raffinate streams are recycled as a leaching solution to form the copper containing pregnant leach solution.

26. The method of claim 23 wherein the second and third overflow stripped organic streams are recycled to the first mixer.

27. The method of claim 23 wherein the second and third rich electrolyte underflow streams are electrowon.

* * * * *